United States Patent [19]

Pugh

[11] Patent Number: 4,569,716

[45] Date of Patent: Feb. 11, 1986

[54] STRAND LAYING HEAD

[75] Inventor: John H. Pugh, Mt. Carmel, Ohio

[73] Assignee: Cincinnati Milacron Inc., Cincinnati, Ohio

[21] Appl. No.: 586,419

[22] Filed: Mar. 5, 1984

[51] Int. Cl.[4] .............................................. B66C 5/02
[52] U.S. Cl. ................................... 156/510; 156/523; 156/574; 156/577
[58] Field of Search ............... 156/523, 530, 574–577, 156/499, 353, 361, 584, 510, 522

[56] References Cited

U.S. PATENT DOCUMENTS

| 3,574,040 | 4/1971 | Chitwood | 156/350 |
| 3,713,933 | 1/1973 | Sokolowski | 156/176 |
| 3,994,769 | 11/1976 | Gersbeck | 156/499 |
| 4,208,238 | 6/1980 | August et al. | 156/523 X |

FOREIGN PATENT DOCUMENTS 502409 6/1953 United Kingdom .
1531435 11/1978 United Kingdom .

Primary Examiner—David Simmons
Attorney, Agent, or Firm—Thomas M. Farrell

[57] ABSTRACT

A strand laying head is disclosed wherein strands of composite material pass from a strand storage device under a spacing roller and are warmed by a heat source. A precompaction roller applies pressure to the strands against a laydown surface as the head moves along the laydown path. A trailing main compacting roller applies final compacting pressure. A heat source is applied to the strand at a point between the precompaction and main compacting rollers to ensure final bonding of the strands.

6 Claims, 16 Drawing Figures

PRIOR ART
FIG. 2
PRIOR ART
FIG. 3
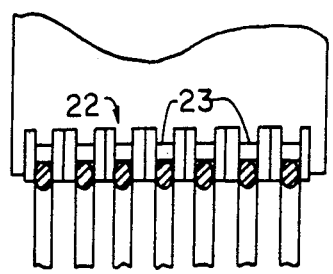
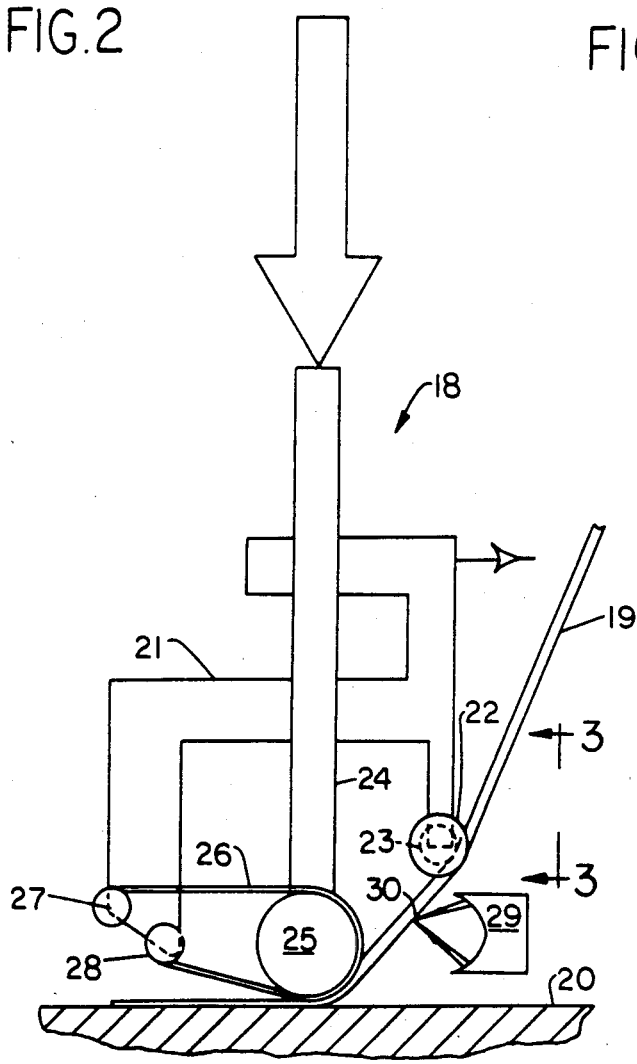
FIG. 5
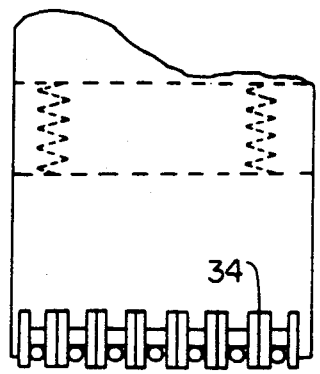

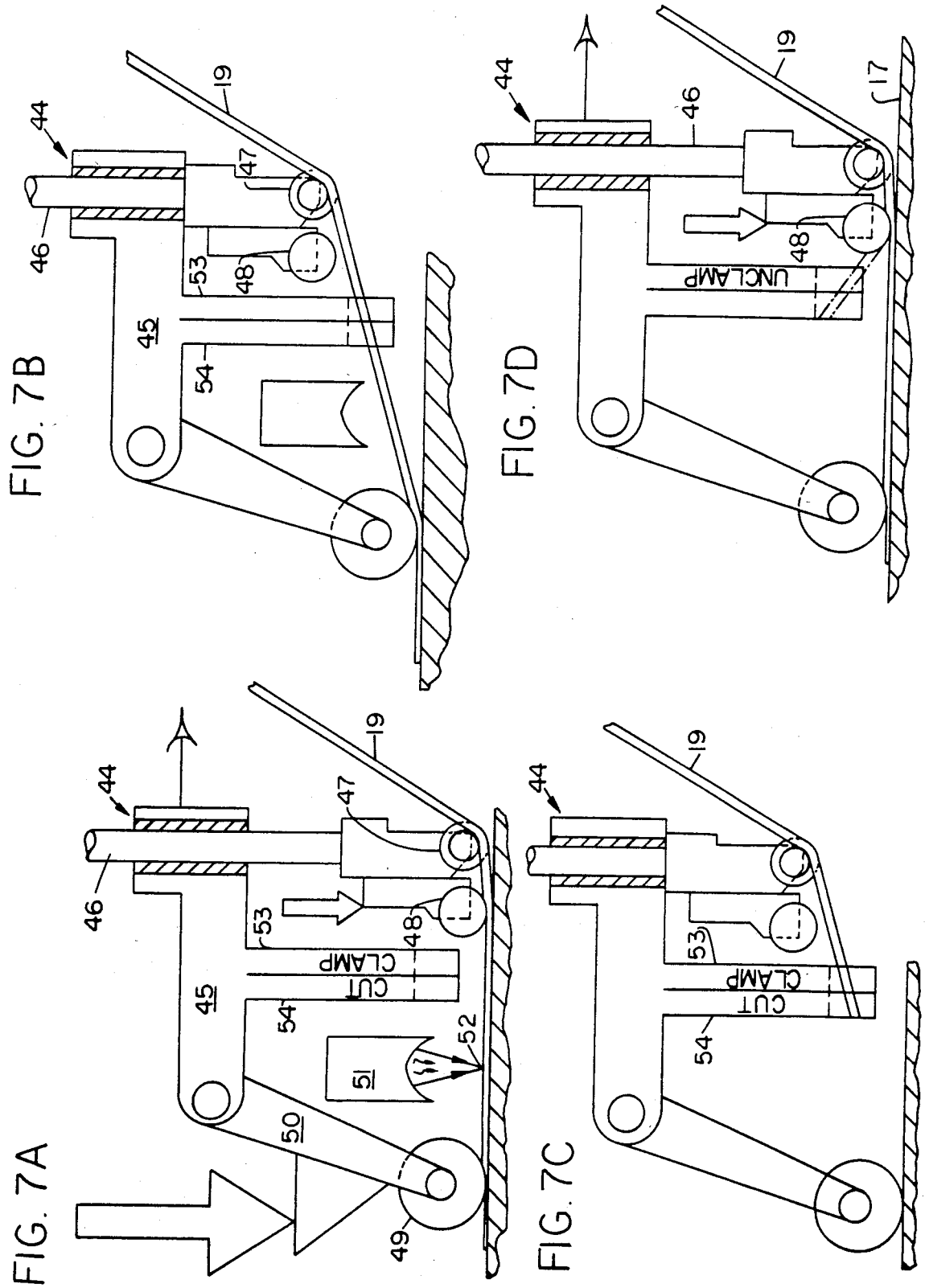

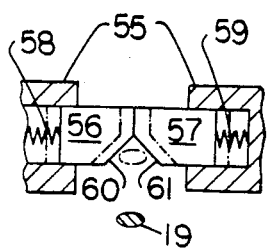
FIG. 8B
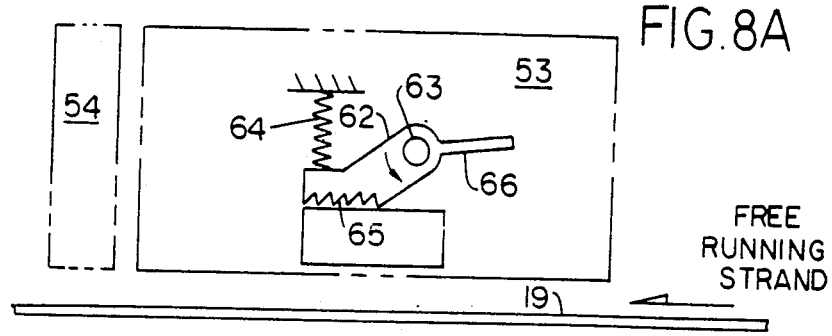
FIG. 8A
FREE RUNNING STRAND
FIG. 8C
ENGAGE CLAMP PAWL
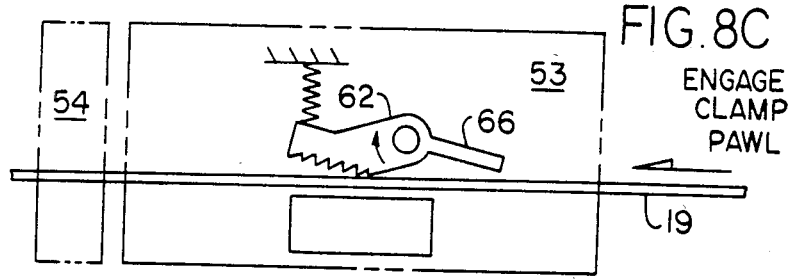
FIG. 8D
CLAMP, CUT & HOLD UNTIL RELEASE
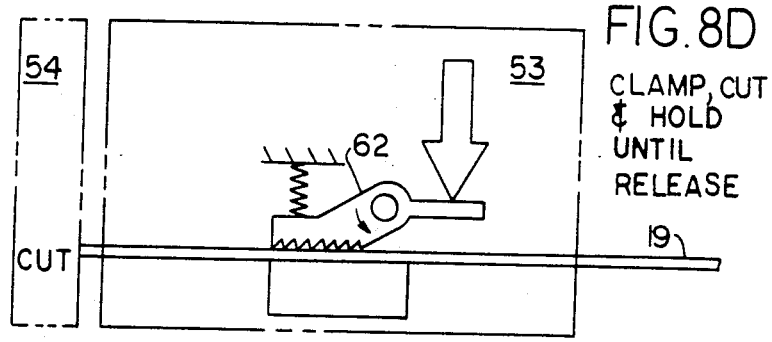
FIG. 9
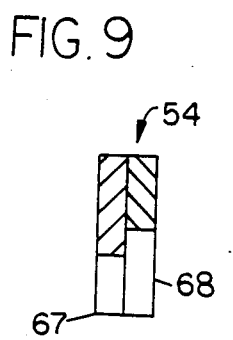
FIG. 10
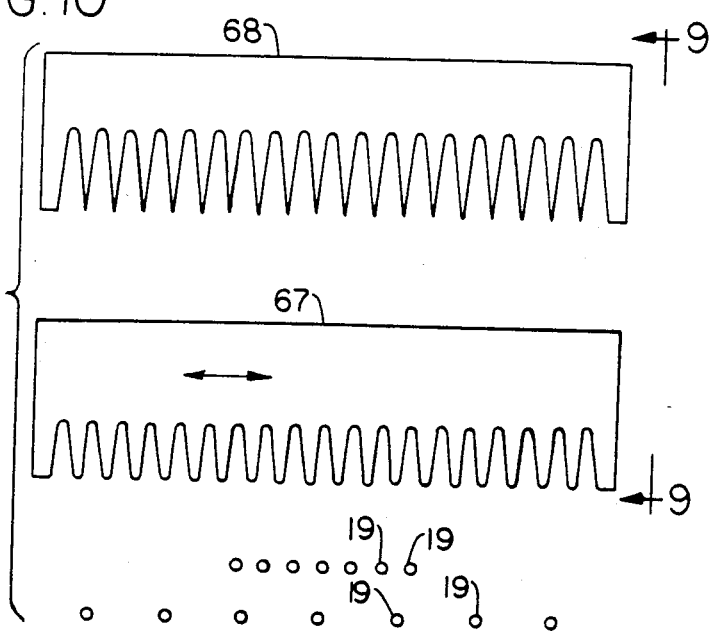

STRAND LAYING HEAD

BACKGROUND OF THE INVENTION

This invention relates generally to automatic machines having a head arranged for dispensing strands of composite material onto a surface to fabricate structures.

In particular, present date technology machines have been developed to arrange and compact strands or tows of composite material; for example, untwisted carbon fibers impregnated with epoxy or thermoplastic resin. Machines of this type may be known as AVSD (Advanced Variable Strand Dispensing) machines, wherein the tows are carried on storage creels, and are routed in parallel fashion at predetermined spaced intervals, beneath a compacting roller which compresses the strands against a surface, thus flattening and causing the strands to be contiguous in nature to create a part structure. Subsequent processing steps on such structures may employ a compression mold to further shape and compact the structure and, in the case of thermosetting resins, a curing operation may be performed, utilizing vacuum bags in autoclaves for receiving the molded part.

Some prior art assemblies have difficulty in handling cut strands, because the strands tend to get away and must be rethreaded for the next pass or lay down of material. Further, difficulties are encountered when using a single compacting roller to compress the material. As additional plys of material are built up, the built up structure becomes somewhat compliant to the compacting roller which must compress the next lay down of strands against the built-up structure. Additionally, certain prior art structures propose spacing the strands with a mechanism somewhat removed from the part compacting unit, and it is felt that through this invention better control of the spacing of the composite strands may be accomplished by placing the spacing mechanism closer to the compacting roller and part surface.

Applicant has obviated the difficulties inherent in the prior art assemblies by a novel strand dispensing head, utilizing a precompaction roller assembly running ahead of the compacting roller. Further, applicant has employed a spacing mechanism in a close relationship with a precompaction roller.

Applicant has further provided a novel strand clamping and cutting mechanism after the precompaction roller, which greatly facilitates ease of restarting the lay down procedure.

SUMMARY OF THE INVENTION

The invention is shown embodied in a composite strand laying head which traverses a strand laydown surface. Strands pass under a guide roller which controls and separates the strands. Next, a precompaction roller impresses the strand on the strand laydown surface. A heat source follows the precompacting roller to warm the strand, and a trailing compacting roller exerts a final compaction pressure on the composite strands.

BRIEF DESCRIPTION OF THE DRAWINGS

FIG. 2 is a diagrammatic view of a prior art strand dispensing head.

FIG. 3 is an elevational view taken in the direction of arrow 3 of FIG. 2.

FIG. 5 is an elevational view taken in the direction of arrow 5 of FIG. 4.

FIGS. 7(a) through 7(d) are diagrammatic view of a second alternate embodiment of a strand dispensing head, having improved cut and clamp facilities.

FIGS. 8(a) through 8(d) are diagrammatic views of improved clamping and cutting sections for the strand dispensing head of FIGS. 7(a) through 7(d).

FIG. 9 is a section through the cutting blades of FIGS. 8(a) through 8(d).

FIG. 10 is an exploded view of the cutting blades of FIG. 9.

DESCRIPTION OF THE PREFERRED EMBODIMENT

Figure 1:
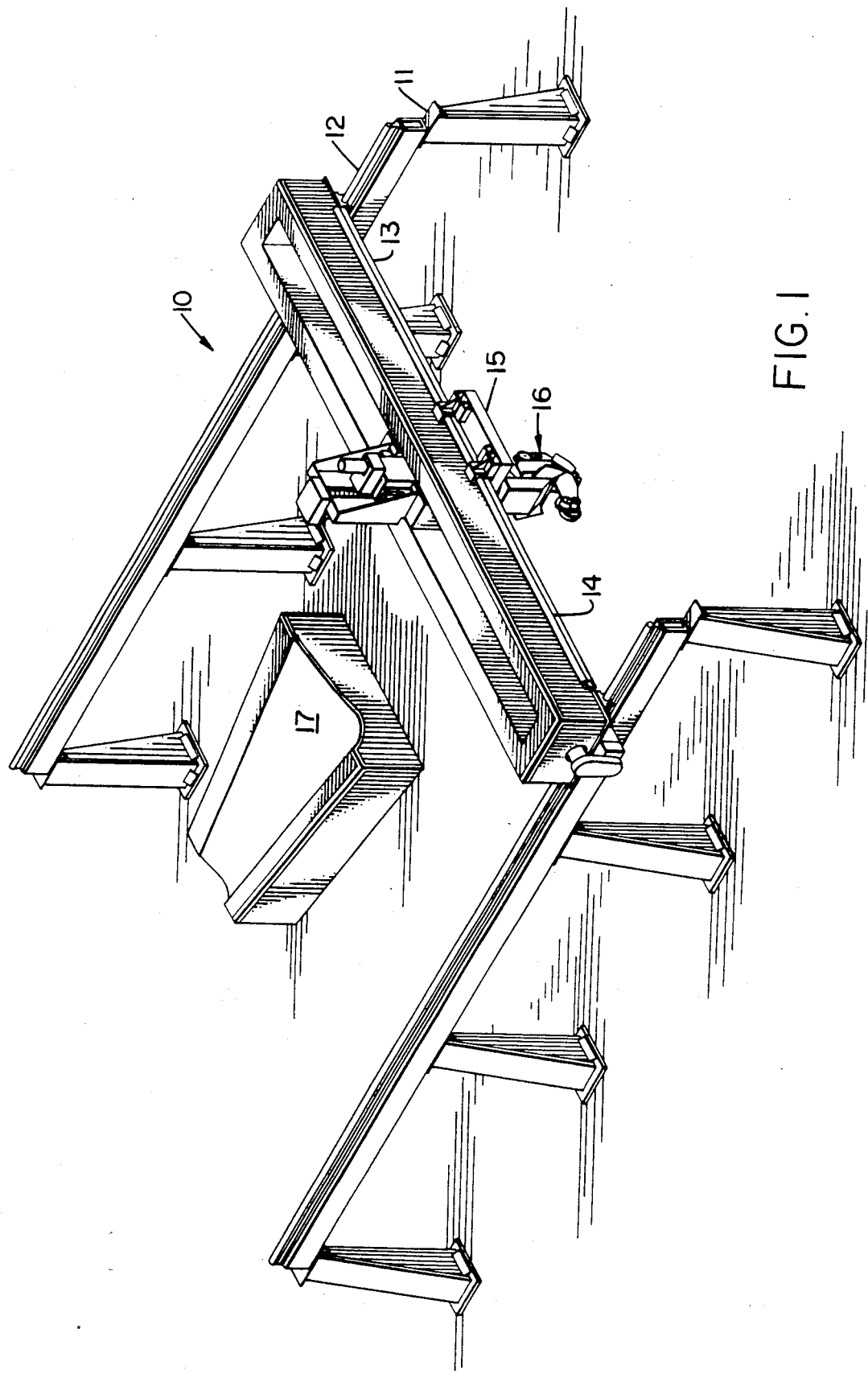
FIG. 1 is an isometric view of a strand dispensing machine having a strand dispensing head attached to a movable slide way system.

FIG. 1 illustrates a basic machine 10 which might embody the present invention, wherein the machine 10 has a base structure 11 with an elevated slideway 12 for supporting an overhead bridge type support, or bifurcated gantry 13. The gantry 13 has a coordinate way system 14, for supporting a saddle 15 which may carry a variety of composite material workheads, such as the strand dispensing head 16 shown. The head 16 lays material on a surface for building up composite structures, such as the mold surface 17 shown in FIG. 1.

FIG. 2 illustrates a prior art head 18 for dispensing strands 19 of composite material onto a support surface 20. The structure is shown in diagrammatic form for ease of understanding, but it may be appreciated by those of ordinary skill in the art, that the details of roller support bearings, slide bearings, and the like, are well within the capabilities of the composite machine designer. In FIGS. 2(a), the head 18 is carried by the machine saddle 15 of FIG. 1 and consists, in part, of a main support frame 21 which carries a rotatable roller assembly 22 having grooves 23 therein for accomplishing a predetermined spacing of composite strands 19 which are received from a creel storage system (not shown). The frame 21 also has a vertically movable support rod 24, which is journalled for relative sliding with the frame 21, and the rod 24 carries a compacting roller 25 at its lowermost end, for impressing a compressive force on strands which are deposited on the part surface 20. In the assembly shown, a release paper 26 is trained from a dispensing reel 27 and around the compacting roller and onto a take-up reel 28 so that the strands 19 will not stick to the compacting roller 25. A heat source 29, such as an infrared lamp, is shown mounted on the support frame 21 and directing its heat onto the strands 19 at a point 30 between the spacing roller assembly 22 and the compacting roller 25, so that softening and compacting of the material may be facilitated. At predetermined intervals, the compacting roller 25 may be lifted off the part surface 20 by withdrawing the support rod upward. The structure shown in FIG. 1 does not illustrate a cutting assembly, but prior art assemblies, in general, tend to utilize a mechanism (not shown) which will cut the strands 19 "up stream" i.e. at a point above the spacing roller assembly 22. FIG. 3 illustrates the grooved spacing roller assembly 22 which serves to space the strands or tows of composite material.

Figure 4:
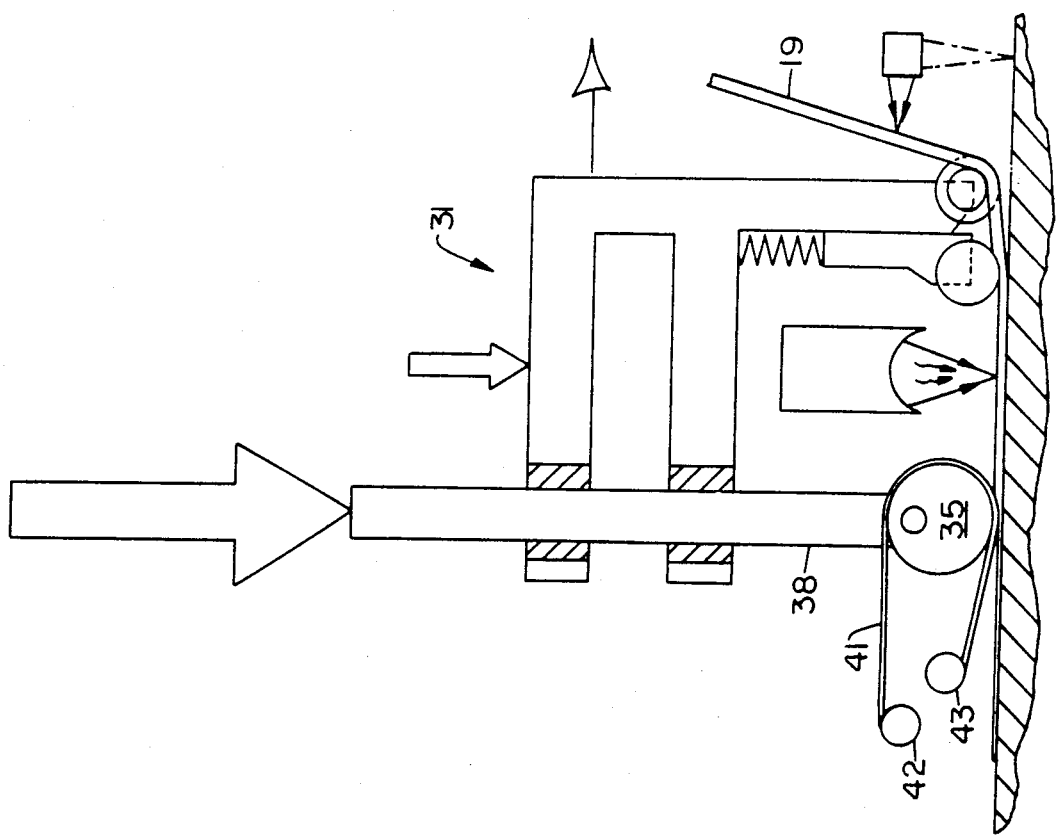
FIG. 4 is a diagrammatic view of an improved strand dispensing head.

FIG. 4 illustrates an improved strand dispensing head 31, which utilizes a precompaction operation, i.e. wherein the base frame 32 of the head 31 is relatively movable in a vertical direction, i.e. by a pneumatic cylinder 33 for example, relative to the support saddle 15, and the base frame 32 carries a spacing roller 34 at its lowermost end leading the compacting roller 35. The placement of the spacing roller 34 near the part surface 36, and in front of the trailing compacting roller 35 serves to insure better spacing of the material on the part surface 36. A precompaction roller 37 is carried on the base frame 32, at a point immediately following the spacing roller 34, so that precompaction or compression of the composite strands 19 is accomplished before the trailing compacting roller 35 performs the final compaction. The compacting roller 35 is carried on a vertical support rod 38 which is independently loaded against the composite surface 36. The base frame 32 carries a pair of heat sources 39,40 one 39 located between the precompaction roller 37 and the trailing compacting roller 35, to soften the material for the final compaction. A preheater 40 is employed in front of the spacing roller 34, to warm the strands 19 before passing under the precompaction roller 37. The preheater 40 may be optionally employed to warm the part surface 36 as well, and the direction of heat on the surface 36 is indicated by a dotted line. FIG. 3(a) illustrates the spacing roller 34 located next to the part surface 36.

Figure 6:
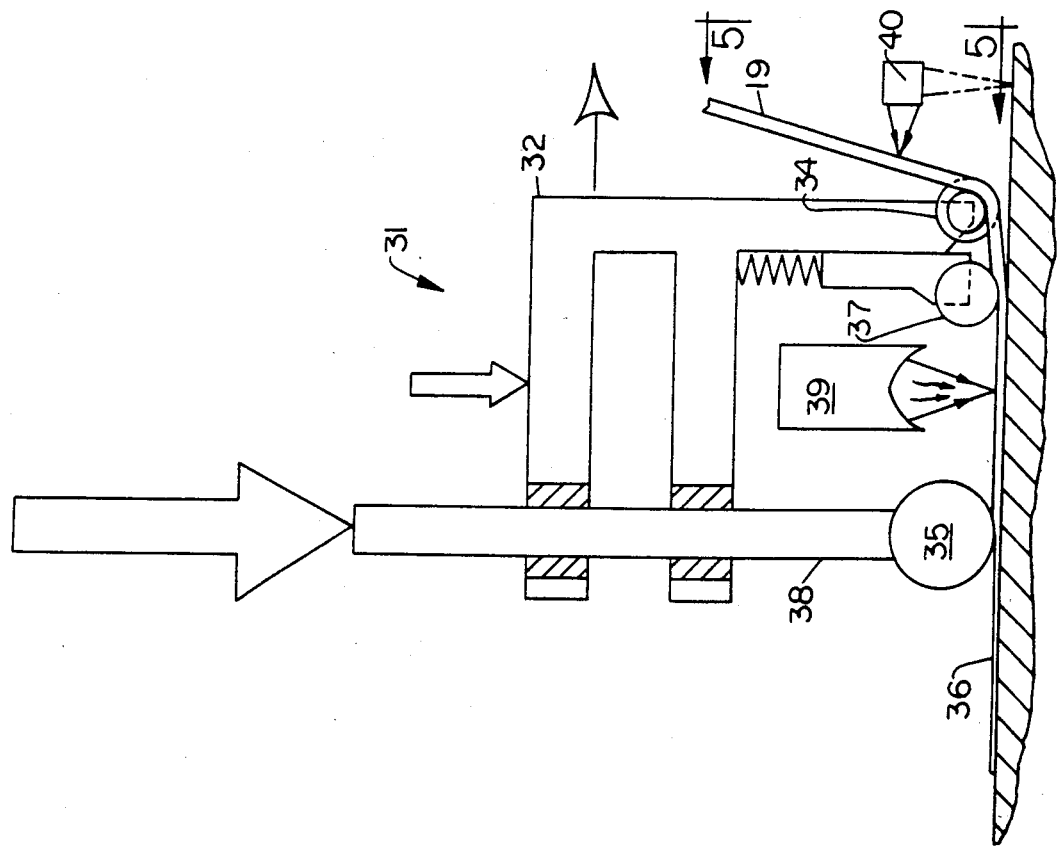
FIG. 6 is a diagrammatic view of an alternate embodiment of the head of FIG. 4.

FIG. 6 is alternate embodiment of the head 31 shown in FIG. 4, wherein the compacting roller 35 may be optionally pinned to the vertical support rod 38, to prevent its rotation. In such manner, the roller 35 now acts as a skid, and release paper 41 is trained around the skid diameter from a paper dispensing reel 42 to a paper take-up reel 43. Good results have been seen in the laboratory from use of a roller as a skid for compacting the composite strands 19.

FIGS. 7(a) through 7(d) show the sequencing of an alternate embodiment for a strand dispensing head 44 having precompaction capabilities. The structure shown in FIG. 7(a) illustrates that the head 44 has a base frame 45 which is carried by the machine saddle 15 (not shown). The base frame 45 carries a vertical roller support rod 46 which is movable along the vertical axis, and the rod 46 has a spacing roller 47 located at its lowermost end. A precompaction roller 48 is carried just behind the spacing roller 47. The base frame 46 has a pivotable trailing compaction roller 49 carried on a swinging arm 50, which is preloaded at selected intervals down against the composite strands 19. The base frame 45 carries a heater 51, such as the quartz lamp shown, at a point 52 between the precompaction roller 48 and the compaction roller 49. The base frame 45 has a clamping section 53 and a cutting section 54 which is fixed with respect to the base frame 45 at a point above the composite material, between the compaction and precompaction rollers 49,48 and before the heater 51. FIG. 7(b) shows the assembly with the precompaction roller 48 and spacing roller 47 raised, which causes the strand 19 to be pulled upward and be trapped in the clamping section 51. FIG. 7(c) illustrates that the cutting section 54 has already cut the strand 19 and that the strand 19 is still firmly clamped in the clamping section 53. FIG. 7(d) shows the head 44 when it is desired to restart laying strands 19 on the part surface or mold surface 17. At such time, the vertical support rod 46 is lowered, driving the strands 19 and precompaction roller 48 down against the working surface 17. At such time, the clamping section 53 is powered to an unclamped position, releasing the strand 19 for continued movement of the strand dispensing head 44.

FIGS. 8(a) through 8(d) illustrates the clamping section 53 of FIG. 7(a), as having a housing portion 55 which supports a pair of slidable blocks 56,57 mounted in opposition to one another and biased by springs 58,59 and, as can be seen in FIG. 8(b), the blocks 56,57 have a beveled portion 60,61 where they join so that the composite strands 19, when pulled upward towards the blocks 56,57 will be forced into the V formed by the beveled portions 60,61 and will be pulled upward, overcoming the biasing springs 58,59 and driving the blocks 56,57 back until the strand position of FIG. 8(c) is reached. At such position, the blocks come together again and prevent the downward movement of the strand 19. The clamping section 53 has a pawl 62, which is pivotably supported on a pivot pin 63 and biased by a spring 64 toward the entry position of the relatively moving strand 19. The lower face of the pawl is provided with fine teeth 65, and is biased downward, against the blocks 56,57. Thus, when the strand 19 is pulled upward as in FIG. 8(c), parting the blocks 56,57 the pawl 62 is driven upward, yet remains biased downward against the strand surface. In such fashion, the friction engagement of the pawl teeth 65 against the strand surface will prevent reverse movement of the strand 19, since any backward movement will cause a rotational movement on the pivot pin 63, assisting the biasing spring 64 in driving the pawl 62 tighter into engagement with the strand surface. A counter moment arm 66 extends rearwardly from the pawl 62, so that an actuating force, such as that which might be supplied by a solenoid plunger and indicated by the broad arrow in FIG. 8(d), can selectively be applied to torque the pawl 62 thus overcoming the biasing spring 64 and releasing the grip of the pawl 62 against the strand 19. The cutting section 54 is located to the left of the clamping section 53 in the figures, and the cut strand 19 as shown in FIG. 8(d) will be prevented from back-pulling and leaving the clamping section 53. It has been determined in tests that the tensile strength of a strand 19 can be as high as 500 pounds. When it is desired to commence strand laying again the precompaction roller 48 is impressed against the strands 19 as shown in FIG. 7(d), and the pawl 62 is released as shown by the application of counter moment force in FIG. 8(d).

FIG. 9 is a side elevational section through the cutting section 54, showing that the cutter blades 67,68 are adjacent to one another and mounted in a slidable fashion in a cutter support housing (not shown). The exploded view of FIG. 10, shows that the cutter blades 67,68 are comb-like, one being stationary and the other being movable with respect to the stationary one in a typical manner found with certain reciprocating shears. The strands 19 are shown in alternate spacings, both wide and narrow, to show that as the strands 19 are lifted towards the cutting section 54, the comb teeth will tend to entrap both single and/or multiple strands 19 to accomplish the cut.

While the invention has been shown in a preferred embodiment and certain alternate embodiments thereof, it is not intended that the invention be so limited to the embodiments shown, but rather the invention extends to all such designs and modifications as come with the scope of the appended claims.

What is claimed is:

1. In a machine tool having a base and a head carrier movable on a base way system with respect to a composite laydown surface, a composite strand laying head, comprising:
   (a) a head frame on said head carrier;
   (b) means, carried on said frame, for spacing a plurality of composite strands while said head frame is moving;
   (c) means, carried on said frame, for precompacting said strands on said laydown surface;
   (d) means, carried on said frame, for compacting said strands on said laydown surface;
   said means for precompacting being located between said means for spacing and said means for compacting,
   (e) means for independently moving said means for precompacting and said means for compacting with respect to said laydown surface and with respect to each other; and
   (f) means for cutting said strands, said means for cutting being located on said frame between said means for precompacting and said means for compacting.

2. The composite strand laying head of claim 1, further comprising:
   (g) means for releasably clamping one side of said cut strands, said means for releasably clamping being located on said frame in juxtaposition with said means for cutting.

3. The composite strand laying head of claim 2, wherein said means for moving comprises means for moving said precompacting means and said compacting means substantially parallel to one another and normal to said composite laydown surface.

4. A method for laying fiber strands on a laydown surface with a strand laying head, comprising the following steps:
   (a) spacing a plurality of fiber strands in a parallel array;
   (b) training said strands across a pair of spaced presser members on said head;
   (c) pressing said strands against said surface by advancing said presser members toward said surface, thereby tensioning said strands;
   (d) longitudinally moving said strands relative to said head;
   (e) retracting one of said presser members away from said surface, thereby allowing strands to follow in a lateral direction;
   (f) clamping said laterally-moved strands;
   (g) cutting said laterally-moved strands; and
   (h) allowing one end of said cut strands to continue longitudinally moving relative to said head.

5. The method of claim 4, wherein step (f) includes clamping said strands between said presser members.

6. The method of claim 5, further including the following steps:
   (i) releasably clamping the other end of said cut strands;
   (j) advancing said one of said presser members toward said surface, thereby impressing said clamped cut strands against said surface, and tensioning said strands;
   (k) releasing said other end of said cut strands;
   (l) continuing longitudinal movement of said strands relative to said surface.

* * * * *